US007978857B2

(12) United States Patent
Nishiguchi et al.

(10) Patent No.: US 7,978,857 B2
(45) Date of Patent: Jul. 12, 2011

(54) SECURE DEVICE HAVING KEY MANAGEMENT FUNCTION AND INFORMATION PROCESSING APPARATUS

(75) Inventors: Naoki Nishiguchi, Kawasaki (JP); Eiji Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 967 days.

(21) Appl. No.: 11/893,168

(22) Filed: Aug. 15, 2007

(65) Prior Publication Data

US 2008/0075290 A1   Mar. 27, 2008

(30) Foreign Application Priority Data

Sep. 26, 2006   (JP) ................................. 2006-260797

(51) Int. Cl.
*H04L 9/00* (2006.01)
(52) U.S. Cl. ....................................................... 380/277
(58) Field of Classification Search .................... 380/277
See application file for complete search history.

(56) References Cited

U.S. PATENT DOCUMENTS

| | | | | |
|---|---|---|---|---|
| 5,796,839 A * | 8/1998 | Ishiguro | ............................ | 380/44 |
| 5,974,144 A | 10/1999 | Brandman | | |
| 2002/0123968 A1 * | 9/2002 | Okayama et al. | ................ | 705/57 |
| 2002/0150250 A1 * | 10/2002 | Kitaya et al. | ................... | 380/277 |
| 2002/0150251 A1 * | 10/2002 | Asano et al. | ................... | 380/277 |
| 2003/0233559 A1 * | 12/2003 | Asano et al. | ................... | 713/189 |
| 2004/0076298 A1 | 4/2004 | Oliver | | |
| 2005/0144470 A1 | 6/2005 | Takashima et al. | | |
| 2006/0277151 A1 | 12/2006 | Sankaran et al. | | |
| 2007/0025694 A1 * | 2/2007 | Takashima et al. | .............. | 386/95 |
| 2007/0050849 A1 * | 3/2007 | Takashima | ....................... | 726/26 |
| 2007/0223691 A1 * | 9/2007 | Takashima et al. | ........... | 380/200 |
| 2008/0022131 A1 * | 1/2008 | Ueda et al. | ..................... | 713/193 |

FOREIGN PATENT DOCUMENTS

| | | |
|---|---|---|
| EP | 1 548 732 A2 | 6/2005 |
| JP | 2003-198527 | 7/2003 |
| JP | 2004-129227 | 4/2004 |
| JP | 2004-342046 | 12/2004 |
| JP | 2005-085188 | 3/2005 |
| WO | WO 99/44364 | 9/1999 |

* cited by examiner

*Primary Examiner* — Christian LaForgia
(74) *Attorney, Agent, or Firm* — Greer, Burns & Crain, Ltd.

(57) ABSTRACT

A secure device has an input unit for dividing content into a plurality of blocks and inputting the plurality of blocks, a key generating unit for sequentially generating keys for encrypting one or plural blocks, a content encrypting unit for encrypting the one or plural blocks by using the generated key, a key information generating unit for generating key information for restoring the generated key used for the encrypting by the generated key, and a storage control unit for outputting contents of each of the blocks encrypted by the content encrypting unit and the key information generated by the key information generating unit to an external storage.

The key sequentially generated by the key generating unit is newly generated when a predetermined condition is satisfied, and varies by every one or plural blocks.

7 Claims, 14 Drawing Sheets

FIG.6

(A) THE CASE WHERE KEY IS GENERATED FOR EVERY BLOCK

| CONTENT CT | BC1 | BC2 | BC3 | ...... | BCz |

| KEY Kn | K2-1 | K2-2 | K2-3 | ...... | K2-z |

| KEY INFORMATION KJ | KJ1 | KJ2 | KJ3 | ...... | KJz |

(B) THE CASE WHERE KEY IS GENERATED FOR EVERY PLURAL BLOCKS

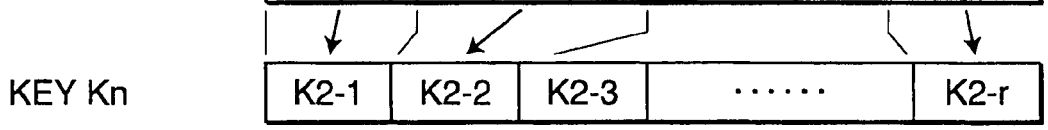

| CONTENT CT | BC1 | BC2 | BC3 | BC4 | BC5 | ...... | BCz |

| KEY Kn | K2-1 | K2-2 | K2-3 | ...... | K2-r |

| KEY INFORMATION KJ | KJ1 | KJ2 | KJ3 | ...... | KJr |

(C) EXAMPLES OF WRITING FORM TO HDD

| FORM 1 | BC1,KJ1 | BC2,KJ2 | BC3,KJ3 | ...... | BCz,KJz |

| FORM 2 | BC1,BC2,BC3,···BCz | KJ1,KJ2,KJ3,···KJz | RANGE INFORMATION TO WHICH KJ IS APPLIED |

FIG.7

| | KEY INFORMATION KJ STORED IN HDD | KEY INFORMATION STORING UNIT IN SECURE CONTROL UNIT |
|---|---|---|
| 1 | ENCRYPTED KEY Km (K2) | — |
| 2 | ENCRYPTED KEY Km (K2), CONTENT RANGE INFORMATION | — |
| 3 | KEY INDEX "n" | GENERATED KEY K2-n |
| 4 | KEY INDEX "n", CONTENT RANGE INFORMATION | GENERATED KEY K2-n |
| 5 | CONTENT ID, KEY INDEX "n" | GENERATED KEY K2-n |
| 6 | CONTENT ID, KEY INDEX "n", AND CONTENT RANGE INFORMATION | GENERATED KEY K2-n |
| 7 | KEY INITIAL VALUE | — |
| 8 | KEY INITIAL VALUE, KEY FORMULA | — |
| 9 | INDEX | IKEY INITIAL VALUE, KEY FORMULA |
| 10 | KEY INITIAL VALUE, INDEX | KEY FORMULA |

FIG.12

| C1 | C2 | C3 | C4 | C5 |
|---|---|---|---|---|
| CONTENT ID | KEY ID | ACQUISITION TIME | UPDATE TIME | RESTORATION STATE |
| 25 | 1 | 2006/06/01,12:34:20 | 2006/06/01,12:34:23 | POSSIBLE |
| | 3 | 2006/06/01,12:34:21 | 2006/06/01,12:34:24 | |
| 5432 | 5 | 2006/06/01,00:00:00 | 2006/06/01,00:00:00 | IMPOSSIBLE |

SECURE DEVICE HAVING KEY MANAGEMENT FUNCTION AND INFORMATION PROCESSING APPARATUS

CROSS-REFERENCE TO RELATED APPLICATION

This application is related to Japanese patent application No. 2006-260797 filed on Sep. 26, 2006 whose priority is claimed under 35 USC §119, the disclosure of which is incorporated by reference in its entirety.

BACKGROUND OF THE INVENTION

1. Field of the Invention

The present invention relates to a secure device having a key management function used for content protection and an information processing apparatus. More particularly, the invention relates to a secure device having a key management function used for recording or reproducing digital contents obtained in a digital broadcast or the like and to an information processing apparatus in which the secure device is assembled.

2. Description of the Related Art

Today, digital content sent in a digital broadcast is large-amount data. Consequently, as a recording device for recording digital content, a hard disk (called HDD) or the like is used. However, if digital content is simply stored as it is into an HDD, the digital content can be freely copied and illegally used.

Therefore, in a digital content recording/reproducing apparatus such as a DVD recorder, dedicated hardware (LSI) is undetachably mounted. Obtained digital content is encrypted with a peculiar key recorded in the hardware and, after that, the content is stored in an HDD.

The digital content stored in the HDD is decrypted by the hardware and then reproduced.

With the configuration, even if an HDD storing content is stolen, without the hardware used for the encrypting, the content cannot be reproduced.

In the case of recording/reproducing digital content on an open platform such as a PC, application software for recording or reproducing content is always monitored by an LSI. A protection mechanism is provided which prevents the recording/reproducing process of an illegal application program.

To prevent illegal use of restoring or recovering of an HDD storing content, management information (content information) including a content list and a use situation of the HDD is recorded in the undetachable LSI.

In addition, from the viewpoint of copyright protection and the like, to prevent illegal use and illegal outflow of digital content, various security measures have been proposed (see Japanese Patent Publication Nos. 2003-198527, 2004-129227, 2004-342046, and 2005-85188).

In the conventional techniques, however, encrypting and decrypting of digital content are performed by a single LSI mounted.

Specifically, digital content encrypted by an LSI is associated with the LSI in a one-to-one corresponding manner. Consequently, in the case of performing a digital content reproducing process, a process of moving digital content to a DVD medium or the like, a process of distributing digital content to another information processing apparatus in accordance with the DTCP-IP, and the like, the digital content has to be decrypted by using the same LSI.

Generally, in the case of performing encrypting, decrypting, or the like of content, an LSI can perform a process on only single content, and cannot simultaneously perform a process of reproducing content A in the device and a process of distributing another content B to another device.

Digital content is generally large and, in some cases, it takes long time to perform the process of distributing the digital content. It is inconvenient for the user that the content reproducing process cannot be performed by the same device during the distributing process. That is, an apparatus satisfying a request for simultaneously reproducing and distributing a plurality of pieces of content is in demand.

On the other hand, if the number of pieces of content which can be processed at the same time coincides with the number of LSIs, by mounting a plurality of LSIs, the plurality of pieces of content can be simultaneously processed. For example, by mounting ten LSIs, ten different reproducing, recording, and distributing processes can be simultaneously performed.

However, the location of each piece of content used in the LSIs at present, whether each pieces of the content is being reproduced or distributed, and the like have to be managed. Content information recorded in the LSIs has to be synchronized among the LSIs. The information management and control are very complicated, and increase the cost of the device itself.

As described above, security is assured by prevention of an illegal use of digital content in a manner similar to the conventional techniques and, moreover, it is desired to satisfy the request for simultaneous use of a plurality of pieces of content, prevention of increase in the cost, and prevention of complication of a development process.

SUMMARY OF THE INVENTION

The present invention provides a secure device provided with: an input unit for dividing content into a plurality of blocks and inputting the plurality of blocks; a key generating unit for sequentially generating keys for encrypting one or plural blocks; a content encrypting unit for encrypting the one or plural blocks by using the generated key; a key information generating unit for generating key information for restoring the generated key used for the encrypting by the generated key; and a storage control unit for outputting contents of each of the blocks encrypted by the content encrypting unit and the key information generated by the key information generating unit to an external storage, wherein the key sequentially generated by the key generating unit is newly generated when a predetermined condition is satisfied, and varies by every one or plural blocks.

With the configuration, since blocks of content are encrypted by using different keys generated, illegal use of content due to leakage of a generated key can be reduced.

BRIEF DESCRIPTION OF THE DRAWINGS

FIGS. 6A to 6C are diagrams illustrating examples of the relation between content and key information of the invention;

FIG. 7 is a diagram illustrating an example of key information of the invention;

FIG. 12 is a diagram illustrating an example of restoration state information managed by a key information restoration managing unit of the invention;

DESCRIPTION OF THE PREFERRED EMBODIMENTS

Figure 1:
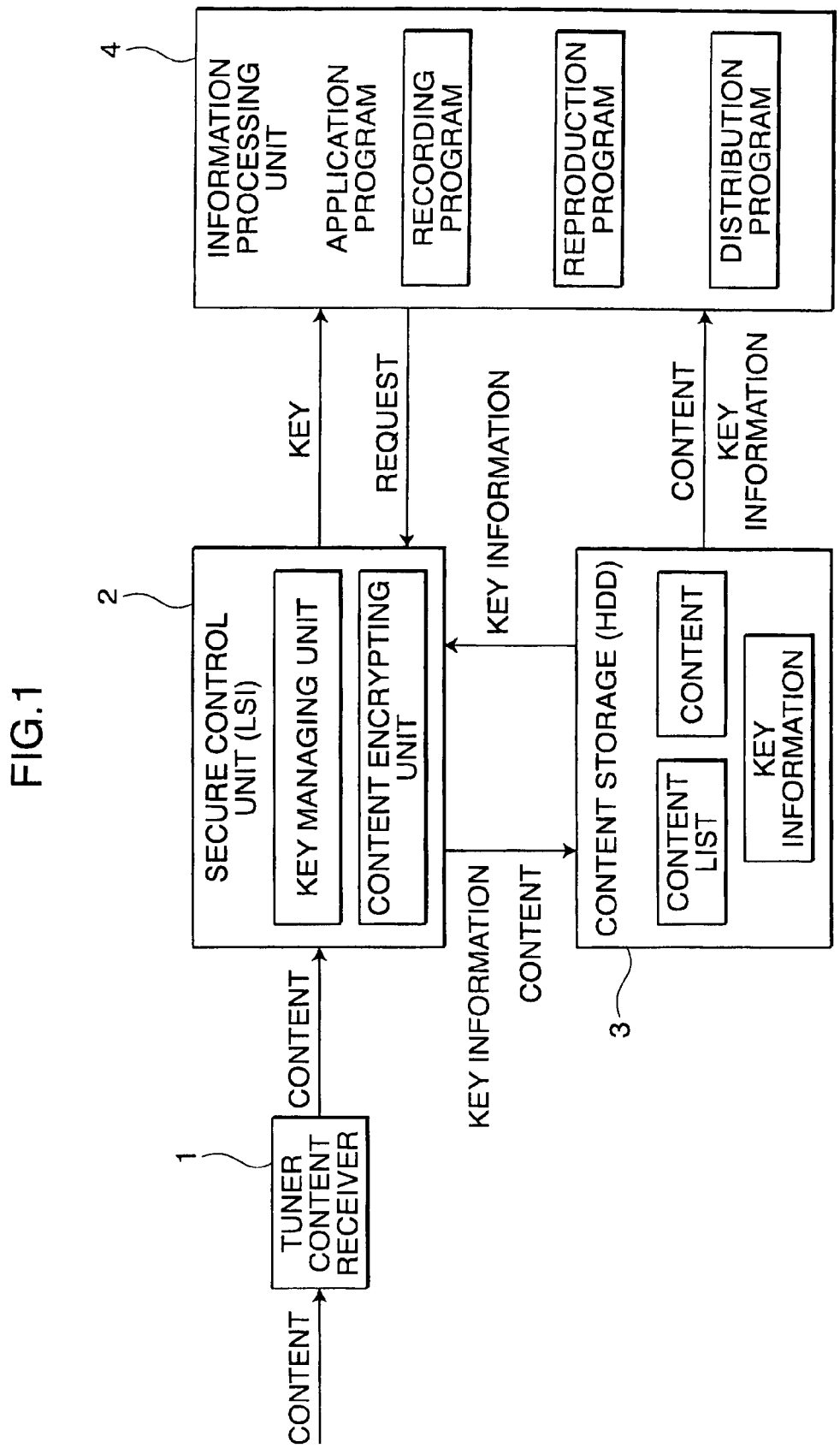
FIG. 1 is a configuration block diagram showing an example of an information processing apparatus of the present invention.

An object of the present invention is to provide a secure device and an information processing apparatus having a key management function capable of sufficiently assuring the security of content and, moreover, by devising management of a key used for encrypting and decrypting, realizing prevention of increase in the cost, effective use of software assets and simultaneous use of a plurality of pieces of content.

The invention is characterized in that it further comprises: a restoration control unit for receiving key information stored in the external storage; a key information restoring unit for restoring the generated key used for the encrypting from the received key information; and an output unit for outputting the restored generated key to an information processing mechanism for decrypting contents of each of the blocks stored in the external storage.

With the configuration, the secure device performs a process of restoring a generated key but does not perform a process of decrypting content itself, so that the process burden on the secure device can be lessened. Also in the case of using one secure device, simultaneous use of a plurality of pieces of content can be substantially realized.

Since simultaneous use of a plurality of pieces of content can be realized by using one secure device, as compared with the case of simultaneously using a plurality of pieces of content by a plurality of secure devices, the cost of manufacture and development can be reduced, and the number of processes of developing hardware and software can be decreased.

In addition, the invention is characterized in that it comprises a key information restoration managing unit for managing a restoration state of the generated key which is restored by the key information restoring unit and, on the basis of the restoration state of the generated key already restored, determining whether the already restored generated key can be updated or not and whether a generated key to be newly restored can be restored or not, wherein when it is determined that restoration is not permitted, the key information restoring unit does not restore the generated key which is not permitted to be restored.

With the configuration, by managing the restoration state of a generated key, whether the generated key can be restored or not is determined. Consequently, the risk of leakage of a generated key can be reduced more effectively, and illegal outflow of content can be prevented.

The invention provides an information processing apparatus having a key management function and provided with: a secure control unit having a function of generating and restoring a key for encrypting content and encrypting contents by using the generated key; a content storing unit for storing the encrypted content and key information having data by which the generated key used for encrypting the content can be restored; and an information processing unit for reproducing the contents stored in the content storing unit, wherein the secure control unit is provided with: an input unit for dividing content into a plurality of blocks and inputting the plurality of blocks; a key generating unit for sequentially generating keys for encrypting one or plural blocks when a predetermined condition is satisfied; a content encrypting unit for encrypting the one or plural blocks by using the generated key; a key information generating unit for generating key information for restoring the generated key used for the encrypting from the generated key; a storage control unit for outputting content of each of the blocks encrypted by the content encrypting unit and the key information generated by the key information generating unit to the content storing unit; a restoration control unit for receiving key information for restoring the generated key used for the encrypting from the information processing unit; a key information restoring unit for restoring the generated key used for the encrypting from the received key information; and an output unit for outputting the restored generated key to the information processing unit, and the information processing unit is provided with: an information obtaining unit for obtaining contents of a block to be reproduced and key information from the content storing unit; a key obtaining unit for supplying the obtained key information to the secure control unit and obtaining a generated key corresponding to the key information from the secure control unit; and a content restoring unit for reproducing contents by sequentially restoring contents of the block obtained from the content storing unit by using the generated key obtained from the secure control unit.

With the configuration, the risk of leakage of the generated keys and illegal use of content can be lessened by varying the generated keys. In addition, decrypting of content itself is performed by the information processor and the secure control unit performs restoration of the keys which can be performed in a relatively short time, the process burden on the secure control unit during reproduction of content can be lessened. Also, since simultaneous use of plural pieces of content is substantially possible with only one secure control unit, the cost and the number of processes can be reduced at the time of realizing simultaneous use of plural pieces of content.

The present invention also provides a program for making a computer realize the key management function of the information processing apparatus.

In the present invention, content denotes multimedia information such as a moving picture, a still picture, and sound, and streaming data of the multimedia information.

Encrypting of content is performed in parallel with reception of content for every predetermined amount. One unit of content to be encrypted is called a block.

An external storage denotes a content storage as will be described later, concretely, a nonvolatile rewritable medium such as a hard disk (HDD).

The secure device of the invention corresponds to a secure control unit (LSI) which will be described later, and is generally provided as a semiconductor integrated circuit device such as an IC chip.

The information processing unit is a functional block of reproducing and distributing content and corresponds to an application program which will be described later.

In the invention, the key information includes a generated key which is encrypted with a master key peculiar to the secure device.

The key information includes the generated key and range information specifying the block of contents to which the generated key is applied for encrypting.

Moreover, the secure device is further provided with a key information storing unit for storing a key generated by the key generating unit, wherein the key information includes a key index that specifies the generated key stored in the key information storing unit.

The key information further includes range information that specifies a block of contents to which the generated key specified by the key index is applied.

The key generating unit generates a key initial value and, from the key initial value, generates a key on the basis of a predetermined rule, and the key information includes the key initial value.

The predetermined condition for generating a key denotes a condition for determining a timing for generating a key, and various timings described later can be considered. For example, each time content of one block as a unit of the encrypting process is received, a new key may be generated. Each time a plurality of blocks corresponding to a predetermined amount are received, a new key may be generated. The details of the generation timings will be described later.

Embodiments of the present invention will be described hereinbelow with reference to the drawings. The invention is not limited to the following description of the embodiments.

(Configuration of Information Processing Apparatus of the Invention)

FIG. 1 is a configuration block diagram showing an example of an information processing apparatus of the invention.

The information processing apparatus of the invention is mainly constructed by a content receiving unit 1, a secure control unit 2, a content storage 3, and an information processing unit 4.

The content receiving unit 1 is a part for receiving various information such as images, sound, and documents and corresponds to, for example, a tuner for receiving image information transmitted in a digital broadcast.

The secure control unit 2 is an LSI chip fixed to a board or the like so as not to be detached, in which a microcomputer including a CPU, a ROM, a RAM, an I/O controller, a timer, and the like is mounted.

The secure control unit 2 is functionally classified into, mainly, a key managing unit and a content encrypting unit.

The content encrypting unit is a part for encrypting received content by using a key (K2) generated in the secure control unit 2. The encrypted content is stored together with key information to be described later into the content storage 3.

The key managing unit is a part for generating the key (K2) for encrypting and decrypting content, storing it and, in response to a request from the information processing unit 4, giving the encrypted key (K2) to the information processing unit 4. Here, the key (K2) is encrypted and given to the information processing unit 4.

The content storage 3 is a memory for storing content, key information, and a content list. As the content storage 3, mainly, a large-capacity storage such as a hard disk (HDD) is used. Alternately, a nonvolatile rewritable recording medium can also be used. For example, a flash memory, a USB memory, a CD-RW, a DVD-RW, or a DVD-RAM may be used.

A content list is information in which content and key information stored in the HDD 3 are associated. With reference to the list, the encrypting form and the storage location in the HDD of content can be known.

The key information includes not only the key (K2) generated by the key managing unit but also index information by which the key can be specified, range information specifying content to which the key is applied, and the like. FIG. 7 shows a concrete example of the key information.

The information processing unit 4 is a part for executing a specific process on received content and corresponds to an application program.

For example, a recording program for recording received content on the HDD 3, a reproduction program for reproducing content stored in the HDD 3, a distributing program for transferring content stored in the HDD 3 to another recording medium (DVD-R or the like) or another information device connected via a network, and the like correspond to the information processing unit 4.

The application programs include function modules corresponding to an information obtaining unit, a key obtaining unit, and a content decrypting unit as described above.

The information processing apparatus of the invention is, for example, an information device such as a personal computer or a work station. The main functions of the invention are realized by a microcomputer and a secure control unit mounted on a personal computer or the like, and a control program and an application program stored in an HDD or the like.

The main functions of the information processing apparatus of the invention include a content recording function and a content reproducing (restoring) function. An outline of the content recording function and the content reproducing function will be described hereinbelow.

Recording of content starts when a recording request is sent from the application program 4 to the secure control unit 2. After that, in the secure control unit 2, the key managing unit generates a key (K2) for encrypting, the key (K2) is encrypted with a key (Km) peculiar to the secure control unit 2, and the content encrypting unit encrypts the received content by using the key (K2) and stores the encrypted content to the HDD 3. The content stored in the HDD 3 is encrypted with the key (K2), and the key (K2) is encrypted with the key (Km) peculiar to the secure control unit 2.

Therefore, even if the HDD 3 is stolen and the content in the HDD 3 is read, if the key (Km) peculiar to the secure control unit is unknown, the content cannot be restored.

Content is received continuously by a tuner 1. The received content is cut every predetermined amount or predetermined time into blocks, and is sequentially encrypted on the block unit basis, and the encrypted content is stored in the HDD.

In the invention, the key (K2) used for encrypting is generated for every block or every some blocks. For example, different keys (K2) for encrypting are generated for each block and the content is encrypted with the different keys (K2) on the block unit basis. The content of a encrypted block is associated with key information specifying the key (K2) with which the block is encrypted, and the resultant is stored in the HDD.

Alternately, content in a plurality of blocks received, for example, for ten seconds, is encrypted with a key K2-1 for encrypting, and content of blocks received for the following ten seconds is encrypted with a newly generated key K2-2.

Reproduction (restoration) of content starts when, for example, a reproduction (decrypting) request is given from the application program 4 to the secure control unit 2. The reproduction request includes content information (such as content ID) read from the HDD 3.

The secure control unit 2 interprets content to be reproduced on the basis of the content information included in the reproduction request and the like, and reads key information associated with the content to be reproduced from the HDD 3. The secure control unit 2 restores the key (K2) associated with the content to be reproduced from the read key information or the information stored in the secure control unit 2, and supplies the key (K2) to the application program 4.

The content itself requested to be reproduced is directly supplied from the HDD 3 to the application program 4 without passing through the secure control unit 2.

The application program 4 restores the content read from the HDD 3 by using the key (K2) given from the secure control unit 2. The restored content is reproduced on a display such as CRT, LCD, or the like, moved to another recording medium, or distributed to another information device via a network.

As described above, the invention is characterized in that, at the time of recording content, a plurality of keys (K2) are sequentially generated by the secure control unit 2, and the content is encrypted by using different keys (K2).

At the time of reproducing content, the encrypted content which is stored in the HDD is directly output from the HDD 3 to the application program 4. On the other hand, the key (K2) for restoring the encrypted content is restored by the secure control unit 2 and output from the secure control unit 2 to the application program 4.

By managing the generation, restoration, and output of the keys (K2) by the secure control unit, security for protecting content and preventing illegal use is sufficiently assured. The secure control unit performs only the generation and restoration of the keys which can be processed in a relatively short time. Consequently, a plurality of pieces of content can be almost simultaneously processed by using only one secure control unit.

(Description of Configuration Blocks of Secure Control Unit)

Figure 2:
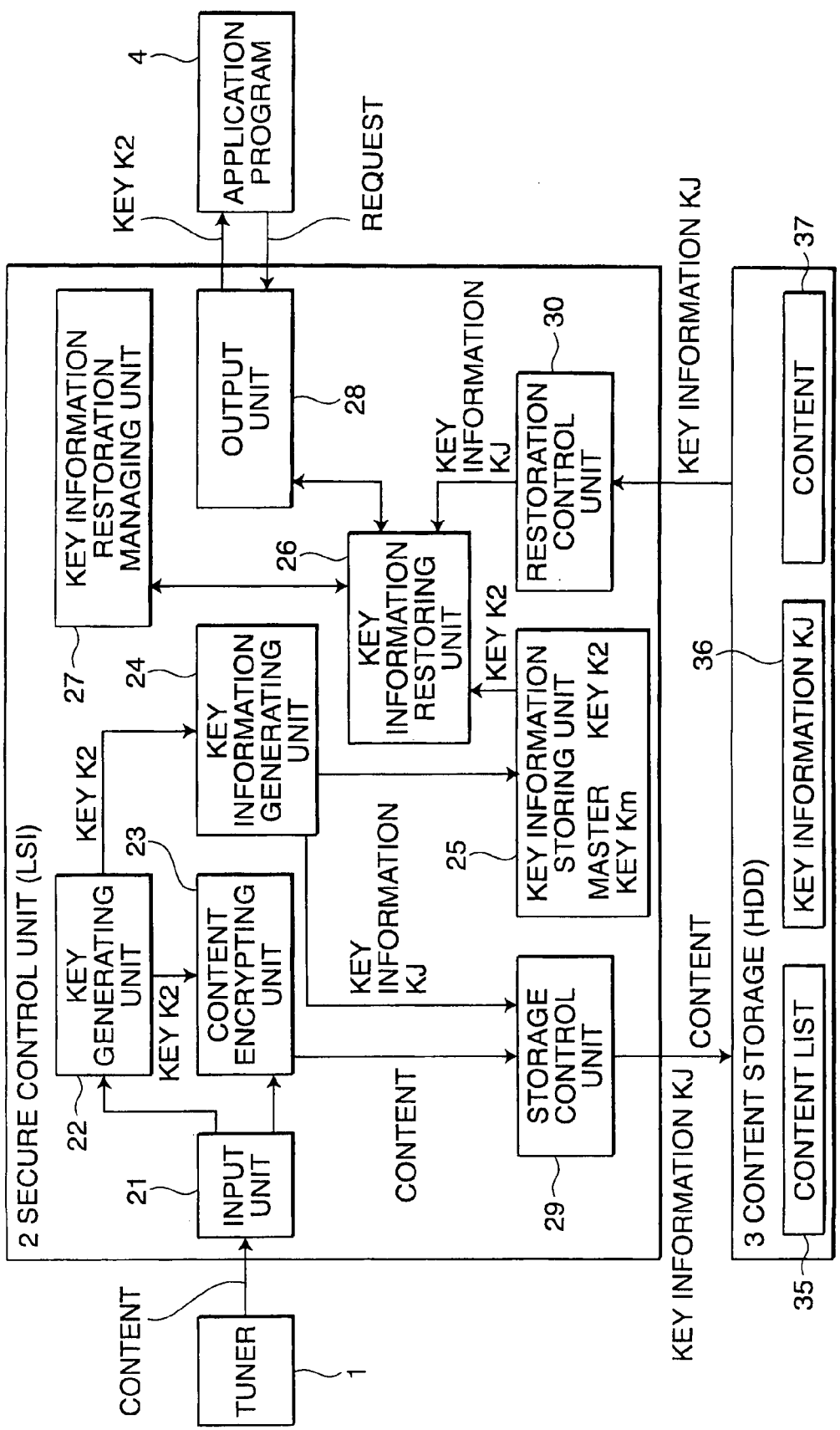
FIG. 2 is a configuration block diagram showing an example of a secure control unit (LSI) of the invention.

FIG. 2 is a configuration block diagram of the secure control unit used in the invention.

The secure control unit 2 has the key managing unit and the content encrypting unit 23 as described above and further includes an input unit 21 as an interface with the tuner 1, an output unit 28 as an interface with the application program 4, and a storage control unit 29 and a restoration control unit 30 as interfaces with the HDD 3.

The key managing unit is configured by a key generating unit 22, a key information generating unit 24, a key information restoring unit 26, a key information restoration managing unit 27, and a key information storing unit 25.

The present invention is characterized in that, different from the case of providing a plurality of LSIs and performing a reproducing process and a distributing process simultaneously on a plurality of pieces of content, only one LSI is provided and a reproducing process and a distributing process are almost simultaneously performed on a plurality of pieces of content.

Since only one LSI is used, the cost of parts and the manufacturing cost can be suppressed more than in the case of using a plurality of LSIs. In addition, hardware and software for synchronously operating the plurality of LSIs are unnecessary, and development cost can also be reduced.

The input unit 21 is a part for supplying content given from the tuner 1 to the content encrypting unit 23. Since moving picture content in a digital broadcast and the like is continuously sent, the moving picture content is divided into, for example, blocks of predetermined data amount (such as 1 Mbyte), and the blocks are sent to the content encrypting unit 23. One block is a unit of the encrypting process. The process of dividing the moving picture content into blocks may be performed at every predetermined time (for example, ten seconds).

Each time content corresponding to one block or a predetermined number of blocks is received, the key generating unit 22 is requested to generate a key (K2). The key generating unit 22 is a part for generating a key (K2) for encrypting one block. As a timing for generating the key (K2), various timings can be considered as will be described later.

A master key Km is pre-stored in the key information storing unit 25 in the secure control unit 2 so as not to be rewritten. The key K2 generated in the key generating unit 22 is encrypted by using the master key Km and stored in the HDD 3. In the case of storing the key K2 in the secure control unit 2, the key K2 itself is not stored as key information. Consequently, information indicative of the key K2 may be stored as it is in the HDD 3 without being encrypted.

The content encrypting unit 23 is a part for encrypting content of one block by using the key K2 generated by the key generating unit 22.

There is a case that content itself supplied from the tuner 1 is already encrypted. In this case, the encrypted content is obtained once by the input unit 21 and, after that, the encrypted content is decrypted with the key (K1) used for the encrypting. After that, the decrypted content is supplied to the content encrypting unit 23. The key K1 is supplied from the tuner 1 or pre-stored in the secure control unit.

That is, the content obtained by decrypting the received content, which was encrypted with the key K1, by using the key K1 is encrypted with the key K2 in the content encrypting unit 23. The content encrypted with the key K2 will be described as "K2 (content)" hereinbelow. The content K2 is supplied to the storage control unit 29 and stored in the HDD 3.

The key information generating unit 24 is a part for generating key information KJ by using the generated key K2.

The key information KJ is information for specifying the generated key K2 and, as will be described later, various modes can be considered. For example, in the case of information obtained by encrypting the generated key K2 with the master key Km, the key information KJ is made by an index indicative of the key K2 of the key information storing unit and information indicative of the range of content to which the key K2 is applied.

The generated key information KJ is supplied to the storage control unit 29 and stored in the HDD 3.

The storage control unit 29 is a part for storing a encrypted content block and the key information KJ into the HDD 3. At the time of storing the content block and the key information KJ, information for associating the content block and the key information KJ is stored in a content list 35.

The HDD 3 as a content storage is a memory for storing, mainly, the content list 35, key information KJ 36, and content 37. The content 37 is content of the block encrypted with the generated key K2.

In the case where the key K2 is included in the key information KJ 36 stored in the HDD 3, not the key K2 itself but the key K2 encrypted with the master key Km or a peculiar key other than the master key held in the secure control unit (or a key generated from the master key) is stored. The key K2 encrypted with the master key Km is expressed as Km (K2).

Figure 5:
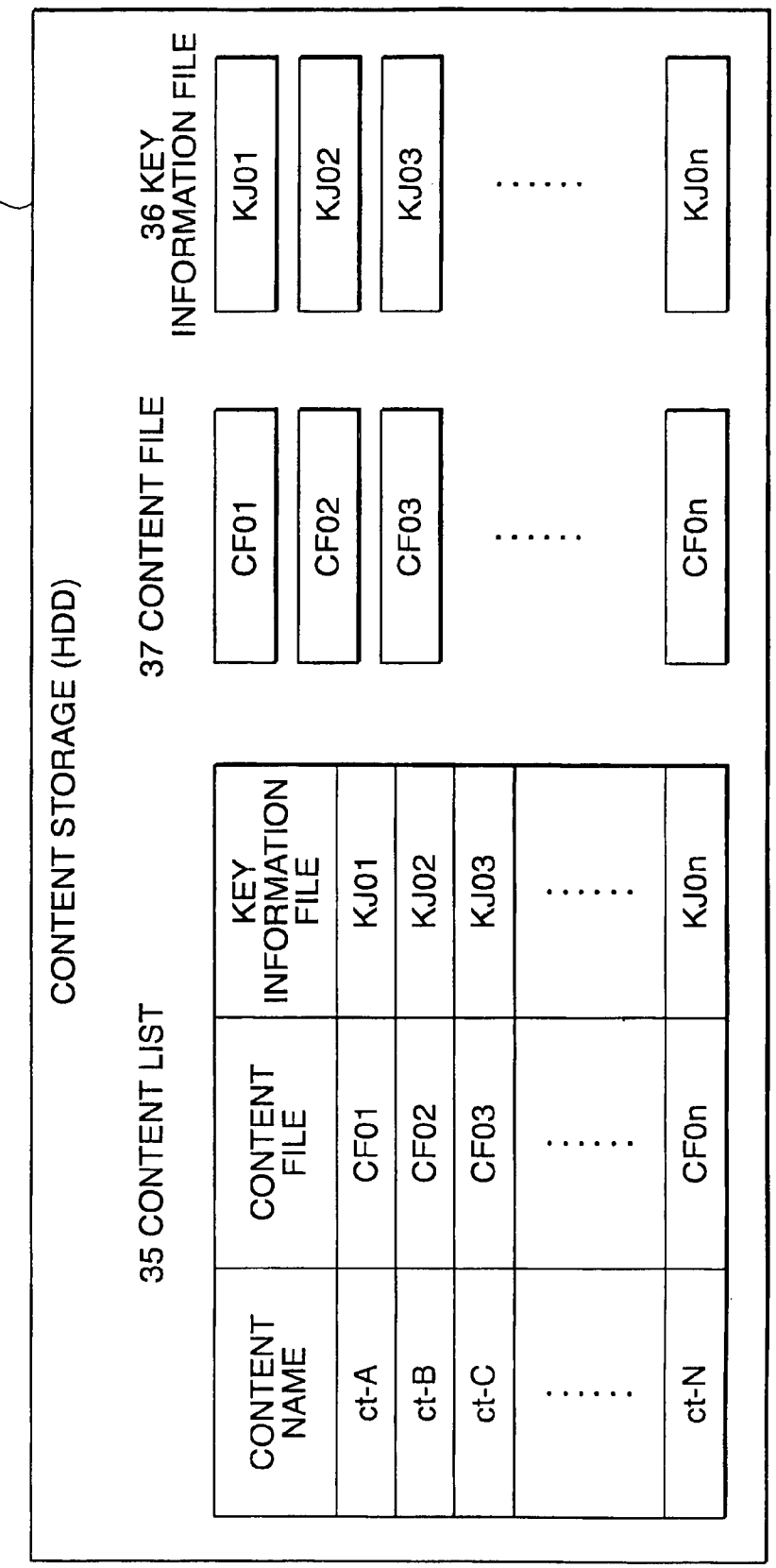
FIG. 5 is a diagram illustrating an example of a content storage of the invention.

FIG. 5 is a diagram illustrating an example of information stored in the HDD 3 as a content storage.

The content 37 is stored as single content files (CF01, CF02, . . . ) on a content-by-content basis. The key information KJ 36 is stored as files (KJ01, KJ02, . . . ) corresponding to the content files.

The content list 35 is a list storing content names (ct-A, ct-B, . . . ), names and storage locations of the content files, and names and storage locations of key information files in a state where they are associated with each other.

It is also possible to associate content with key information and express the obtained information in a plurality of files.

The key information storing unit 25 stores various information used by the secure control unit 2 and is a part storing not only the master key Km which is fixedly stored but also the generated keys K2, keys output from the output unit 28, initial values for key generation, a key generation calculating method, and the like.

The restoration control unit 30 is a part for reading the key information KJ from the HDD 3 in response to a request from the key information restoring unit 26. The read key information KJ is given to the key information restoring unit 26.

The key information restoring unit 26 is a part for restoring the key (K2). Here, the key (K2) is restored on the basis of the key information KJ read by the restoration control unit 30. According to the key information KJ, information is obtained from the key information storing unit. The restored key (K2) is output from the output unit 28 to the application program 4 which sent a reproduction request or distribution request.

The key information restoration managing unit 27 is a part for managing information such as time of acquisition and updating of a restored key and a flag indicating whether a key can be restored or not.

For example, when the number of keys which can be simultaneously output to an application is one, in the case where a key KEY is output to an application program A, output time is stored. When a request for outputting (restoring) a different key KEY is sent from the application program A in the state where the above-described key KEY is output, a message indicating that outputting (restoring) of the different key KEY is not permitted and the key cannot be restored is transmitted to the application program A. In this case, by sending a notification of stop of the use of the key KEY and requesting for another key, output (restoration) of a key is enabled.

The above units are main configuration modules of the secure control unit 2. The functions of the modules are realized by a microcomputer provided in the LSI and a control program stored in a ROM in the LSI, a flash memory, or the like. Preferably, a nonvolatile rewritable memory is used as the key information storing unit 25 in the LSI.

As described above, the secure control unit 2 mainly encrypts content and generates and restores a key. Decrypting (restoring) of encrypted content is not performed on the inside of the secure control unit. A process of reading content itself from the HDD 3 in order to decrypt the content is performed by not-shown another logic without using the secure control unit. The read content is directly supplied to the application program. The application program decrypts the read content.

(Description of Encrypting of Content and Key Management of the Invention)

Figure 3:
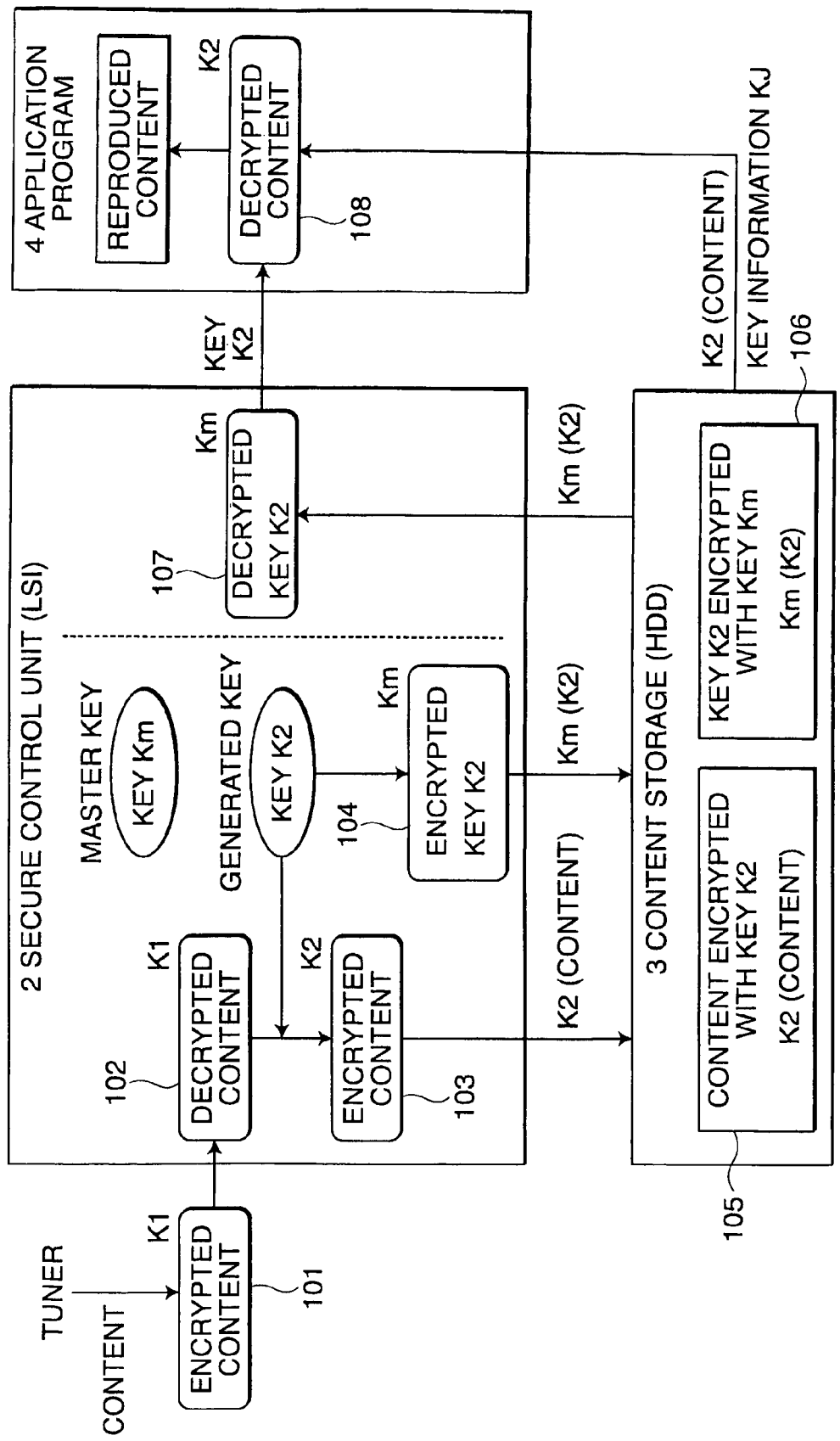
FIG. 3 is a diagram illustrating an example of encrypting and the like of content and a key of the invention.

FIG. 3 is a schematic diagram illustrating a process of encrypting content and a key and the like of the invention.

Figure 4:
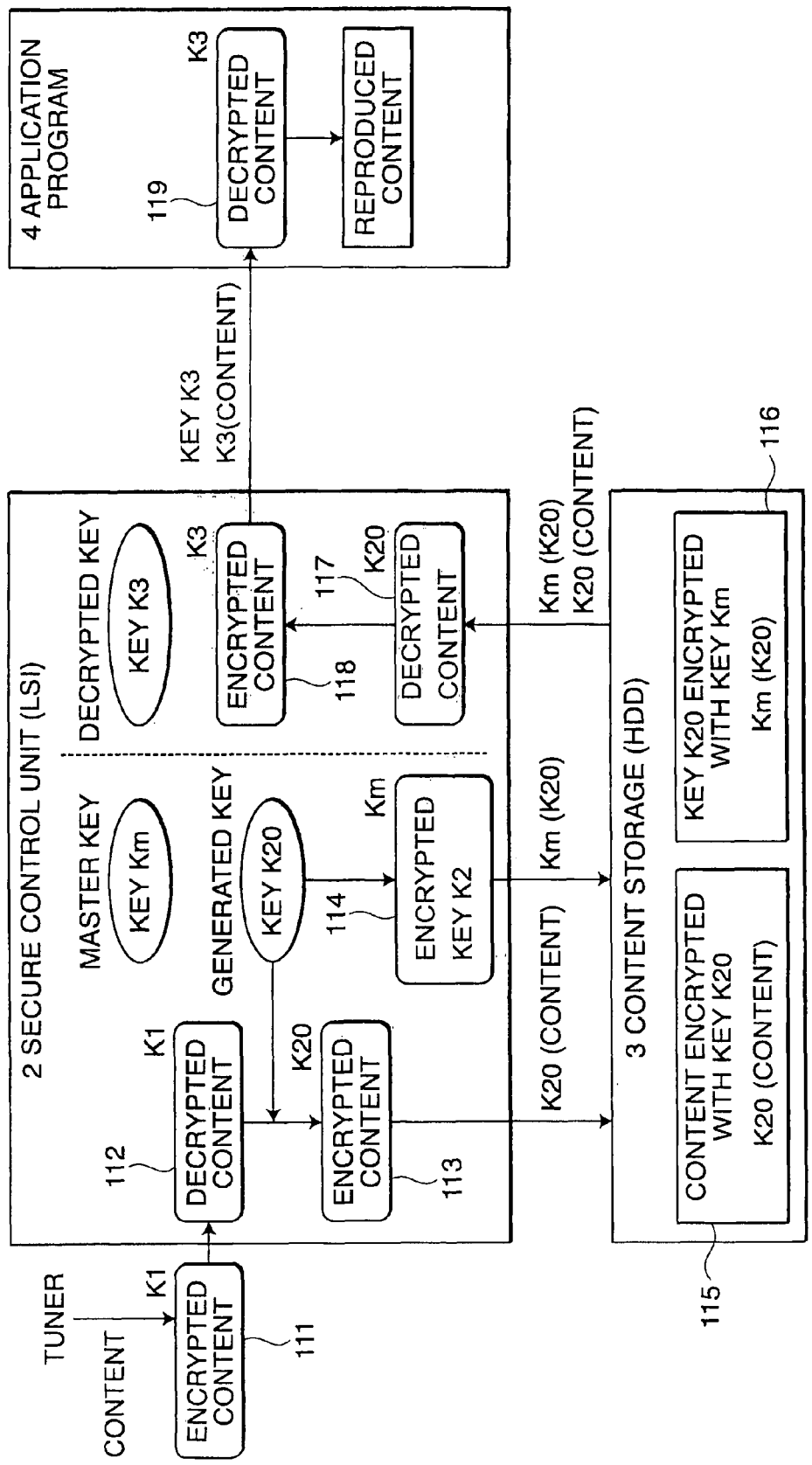
FIG. 4 is a diagram illustrating an example of encrypting and the like of content and a key of a conventional technique.

FIG. 4 is a schematic diagram illustrating a process of encrypting content and a key and the like conventionally performed.

First, the conventional encrypting process and the like in FIG. 4 will be described.

"Kn" denotes a key "n" and "Km" indicates a master key peculiar to the secure control unit. "Kn (D)" indicates D encrypted with the key "n". D denotes an object to be encrypted and corresponds to, for example, content and a key.

In 111 in FIG. 4, content received by the tuner 1 is input. The input content is content (K1 (content)) encrypted with the key K1. The key K1 is preliminarily stored in the secure control unit 2 or input in a encrypted form like the content. The input content (K1 (content)) is decrypted with the key K1 (112).

One key K20 is generated for the input content. After that, content decrypted with the key K1 is encrypted by using the generated key K20 (113). The content (K20 (content)) encrypted with the key K20 is stored in the HDD 3 (115).

On the other hand, the generated key K20 is encrypted by using the master key Km (114). The encrypted key (Km (K20)) is associated with content and stored in the HDD 3 (116).

The above process corresponds to content recording process.

In the content reproducing process, content to be reproduced (K20 (content)) and the key (Km (K20)) are read from the HDD 3. That is, both of the content and the key is supplied to the secure control unit 2.

The read key is decrypted in the secure control unit 2 by using the master key Km. After that, the read content is decrypted in the secure control unit by using the decrypted key K20 (117).

Next, a key K3 is generated in the secure control unit and the decrypted content is encrypted by using the key K3 (118). This encrypting operation is performed to prevent content from being leaked and illegally used at the time of supplying the content to the application program.

The encrypted content (K3 (content)) and the key K3 are output from the secure control unit to the application program 4 which sent the reproduction request. In the application program 4, the encrypted content (K3 (content)) is decrypted by using the key K3 (119). By the operation, reproducible content is generated and displayed later on a display or the like.

As described above, in the conventional technique, at the time of the reproducing process, both of a key and content are decrypted by using the secure control unit 2 and the decrypted content is supplied to the application program 4.

On the other hand, in the process of the present invention of FIG. 3, at the time of the reproducing process, the secure control unit 2 restores a key and delivers it to the application program 4, but does not restore content.

In FIG. 3, in the content receiving process, in a manner similar to the conventional technique, encrypted content (K1 (content)) is input (101), and decrypted with the key K1 (102).

Next, in the case where content corresponding to one block is input, the key K2 is generated. By using the key K2, the decrypted content is encrypted (103).

The encrypted content (K2 (content)) is stored in the HDD 3 (105).

The generated key K2 is encrypted with the master key Km (104). The encrypted key (Km (K2)) is stored as key information in the HDD 3 (106).

The key K2 is generated for every predetermined number of blocks of content which is input after that, or for every blocks in a predetermined time, and the encrypting operation is performed by using the newly generated key K2 for every input blocks.

Further, content of the number of pieces corresponding to the number of input blocks and the key information KJ generated from the key K2 with which the blocks are encrypted are stored so as to be associated with each other in the HDD 3. At this time, a content list is also generated.

At the time of reproducing content, content to be reproduced (K2 (content)) and key information KJ corresponding to the content are read from the HDD 3 directly by the application program 4.

The key information KJ corresponding to the content is supplied to the secure control unit. On the basis of the key information KJ, the key (Km (K2)) stored in association with the content to be reproduced is read by the secure control unit 2. The read key (Km (K2)) is decrypted by using the master key Km (107). The decrypted key K2 is supplied to the application program 4 which sent the reproduction request.

The application program 4 which sent the reproduction request decrypts the directly supplied content (K2 (content)) with the key K2 received from the secure control unit 2 (108). The decrypted content is reproducible content and is reproduced on a display or the like.

Therefore, the process of decrypting content itself is performed by the application program and is not performed by the secure control unit 2. At the time of reproduction, only the key decrypting process which can be performed in a relatively short time is performed in the secure control unit 2, so that the secure control unit 2 is not occupied for a long time by a single reproducing process. Therefore, even if there are a reproduction request process and a distribution request process by two application programs 4 in the same period of time, in the secure control unit 2, only a process of decrypting a key for reproduction and a process of decrypting a key for distribution are performed in a short time. Consequently, the secure control unit 2 is not occupied by a single process for a long time. Even if there is only one secure control unit, the reproducing process and the distributing process after that can be performed in parallel almost in a real-time manner.

(Description of Key Generation Timing, Key Information, and Encrypted Content)

The timing for generating a key used for encrypting a block, the key information KJ generated by the key information generating unit 24, and content encrypted by the content encrypting unit 23 will be described.

As described above, the input content is divided into blocks and encrypted with the key K2 on the block unit basis. As the key K2, different keys are generated for every block or every some blocks. Examples of the generation timing are as follows.

(a) A timing when blocks of a number corresponding to an amount of the encrypting process fixedly determined in advance are input The amount of the encrypting process is pre-stored in the secure control unit.

For example, if the predetermined amount is 1 megabyte and the amount of one block to be encrypted is 1 megabyte, a different key K2 is newly generated for each block.

If the predetermined amount is 1 megabyte and the amount of one block is 200 kilobytes, first five blocks are encrypted with the same key K2-1 and the following five blocks are encrypted with a newly generated key K2-2.

(b) A timing when a plurality of amounts are prepared for the encrypting process and a plurality of blocks corresponding to any of the amounts are input This corresponds to a case where the amount of the encrypting process is not fixed but variably set. In the case where the unit amount of the encrypting process varies according to the kind of content, for example, whether it is a moving picture or a still picture, or whether it has a high compression ratio or a low compression ratio, the key generation timing is also varied according to the amount of the encrypting process. In this case, a plurality of amounts of the encrypting process may also be stored in the secure control unit, or the amount of the encrypting process may be instructed from an external device each time content is input.

For example, each time blocks of a number corresponding to an instructed amount are input, the key K2 is newly generated.

(c) Predetermined content encrypting process time

For example, when a fixedly predetermined time is 10 seconds, blocks which are input in the 10 seconds are encrypted by using the same key K2, and blocks which are input in the following 10 seconds are encrypted with a new key. That is, a new key K2 is generated in every 10 seconds. The value of the process time may be pre-stored fixedly in the secure control unit or set from the outside.

(d) Plurality of variable encrypting process times

For example, a plurality of encrypting process times are pre-stored in association with the kinds of content. The encrypting process time to be employed is determined in accordance with the kind of input content, and the key K2 is generated for every process time determined. Alternately, it is also possible to input the encrypting process time at the time of inputting content and newly generating the key K2 for every input encrypting process time.

(e) The timing for generating a key is variably determined according to a random number. For example, prior to input of content, the amount of the encrypting process is determined at random according to a random number. Each time blocks of a number corresponding to the determined amount are input, the key K2 is newly generated, and a plurality of blocks may be encrypted with the generated key K2 until reaching the amount. That is, the timing for generating the key K2 may be irregular.

FIGS. 6A to 6C are diagrams illustrating the relations among content, keys, and key information used in the invention.

As described above, input content is divided into blocks each having a predetermined size and encrypted. It is assumed that content of one block as a unit of encrypting is BCn (n=1, 2, ... Z).

FIG. 6A shows a case where a new key K2 is generated each time one block is encrypted. Specifically, a key K2 corresponding to one block content BC is generated. The keys K2 are K2-1, K2-2, ... K2-Z.

Further, the key information generating unit 24 generates the key information KJ in correspondence with the generated key K2. The key information is expressed as KJn (n=1, 2, ... Z).

When one content CT is divided into Z blocks (BC1, BC2, ... BCz) and encrypted as shown in FIG. 6A, the key K2 and the key information KJ corresponding to each of the blocks are generated. For example, a key K2-$i$ and key information KJi correspond to block content BCi.

FIG. 6B shows a case where a new key K2 is generated for every plural blocks.

First, two blocks (BC1 and BC2) are encrypted by using the same key K2-1. A different key K2-2 is newly generated for the following three blocks (BC3, BC4, and BC5). The three blocks are encrypted by using the key K2-2.

Therefore, the number (r) of the keys generated is smaller than the number (z) of the blocks. The key information KJ is generated for each key Kn, so that the number of pieces of the key information KJ is the same as the number (r) of the keys.

The blocks BC of the content and the key information KJ are sent to the HDD 3. As an embodiment, in the case where the block content BC and the key information KJ are sent separately to the HDD 3, the key information KJ includes information (range information) specifying a corresponding content block.

For example, in the case of FIG. 6A, key information KJ1 includes information indicating that a block to which the key information KJ1 is applied is BC1. In the case of FIG. 6B, key information KJ2 includes information indicating that blocks to which the key information KJ2 is applied are BC3, BC4, and BC5.

Information may be supplied to the HDD 3 in forms as shown in FIG. 6C. In the case of a form 1 in FIG. 6C, the storage control unit 29 performs a process of associating the block content BC with key information KJ corresponding to the block content BC. After that, the associated information is sent as pair information to the HDD 3.

In the case of a form 2 in FIG. 6C, the block content BC, the key information KJ, and range information indicative of the relation between the block content and the key information are separately sent to the HDD 3.

In the case where the key information KJ includes the range information, to assure security, the range information may be included after being encrypted with the master key Km. Also in the case of the form 2 in FIG. 6C, to assure security, the part of the range information which is encrypted with the master key Km may be sent to the HDD 3.

FIG. 7 is a diagram illustrating an embodiment of the key information of the invention.

FIG. 7 shows some concrete examples of the key information KJ generated by the key information generating unit 24. As the key information KJ, any of the concrete examples can be employed. The invention is not limited to the concrete examples.

Only any one piece of the key information KJ in FIG. 7 may be employed for one piece of content, or a plurality of pieces of the key information KJ may be stored. When the plurality of pieces of the key information KJ are stored, the original key K2 can be restored from any of the key information.

FIG. 7 also shows information to be stored in the key information storing unit 25 in the secure control unit 2 in correspondence with ten kinds of key information KJ.

No. 1 shows that the key (Km (K2)) encrypted with the master key Km is stored as key information in the HDD 3. In this case, even if the HDD 3 is stolen and the key (Km (K2)) is read, it is difficult to restore the generated key K2 itself without knowing the master key Km.

In the case of restoring the key K2, the encrypted key (Km (K2)) is read from the HDD 3 and supplied to the secure control unit. The secure control unit to which the key (Km (K2)) is supplied can restore the generated key K2 by applying the master key Km to the key (Km (K2)).

No. 2 shows the case where the generated key (Km (K2)) encrypted with the master key and the information indicative of the range of applying the content are stored as the key information KJ in the HDD 3. In this case as well, it is unnecessary to store the key K2 in the secure control unit.

No. 3 shows the case where n pieces of generated keys K2-$n$ are stored in the key information storing unit 25 in the secure control unit, and a key index "n" indicative of the index number specifying the key K2-$n$ is stored in the HDD 3.

For example, in the case where the key K2-3 is generated for the third block BC3, the key information generating unit 24 generates an index number (for example, 3) specifying the key K2-3, and the index number is set as the key index "n". The generated key K2-3 itself is stored in the key information storing unit 25 in the secure control unit, and the key index "n" (=3) is stored in the HDD 3.

In this case, even if the key index "n" in the HDD 3 is illegally read, the generated key K2 stored in the secure control unit cannot be specified from the key index "n".

In the case of restoring the generated key K2, the key index "n" is read from the HDD and supplied to the secure control unit. The secure control unit to which the key index "n" is supplied reads the generated key K2-$n$ corresponding to the key index "n" from the key information storing unit 25.

No. 4 shows the case where the information indicative of the content to which the generated key is applied (content range information) is stored in addition to the key index "n" in the HDD 3. In this case as well, the generated key K2 itself is stored in the secure control unit.

No. 5 shows the case where the ID specifying one piece of content (content ID) and the key index "n" are stored in the HDD 3. In the case where one piece of content is divided into "n" blocks and encrypted, the number of a block can be indicated by the key index "n". The generated key K2 itself used for encrypting the block is stored in the secure control unit.

No. 6 shows the case where the content range information is added to the key information of No. 5.

No. 7 shows the case where the key initial value is stored in the HDD 3. The key initial value is a value as the base for generating a key in accordance with a rule. It is assumed that the keys K2 generated sequentially after that are generated in accordance with a rule.

For example, the third generated key K2-3 may be generated by adding a predetermined specific value to the second generated key K2-2 or by adding all of keys (K2-1 and K2-2) generated before. As another method, keys may be sequentially generated by using a predetermined key formula.

When such a rule is determined in advance, it is sufficient to store a key initial value and it is unnecessary to store all of keys K2 generated after the key initial value. In other words, by storing only the key initial value, all of the keys K2 generated after that can be reproduced. In this case as well, the generated key K2 may or may not be stored in the secure control unit.

No. 8 shows the case where the key initial value and the above-described key formula are stored in the HDD 3. In this case, one key formula is not fixedly used but a plurality of key formulae can be used. That is, a plurality of different keys can be generated from one key initial value.

No. 9 shows the case where an index as the number of a set of a key initial value and a key formula is stored in the HDD 3. In this case, the key initial value and the key formula are stored in the secure control unit.

In the case of restoring the key K2, it is sufficient to read the index of the key K2 from the HDD 3 and supply it to the secure control unit. The secure control unit to which the index is supplied specifies the key initial value and the key formula from the index and can sequentially generate the keys K2.

No. 10 shows the case where the information of No. 9 is recombined, the key initial value and the index are stored in the HDD 3, and the key formula is stored in the secure control unit. In this case, by supplying the key initial value and the index read from the HDD 3 to the secure control unit, the key formula is read from the key information storing unit 25 first, and the generated key K2 can be reconstructed from the key initial value and the key formula.

As described above, various modes of the key information KJ stored in the HDD 3 can be considered. A mode to be employed may be determined fixedly in advance or according to a standard such as the security level.

For example, in the case where ten security levels can be set and the security level 3 is set, No. 3 in FIG. 7 may be employed.

(Concrete Example of Content Encrypting Process)

Figure 8:
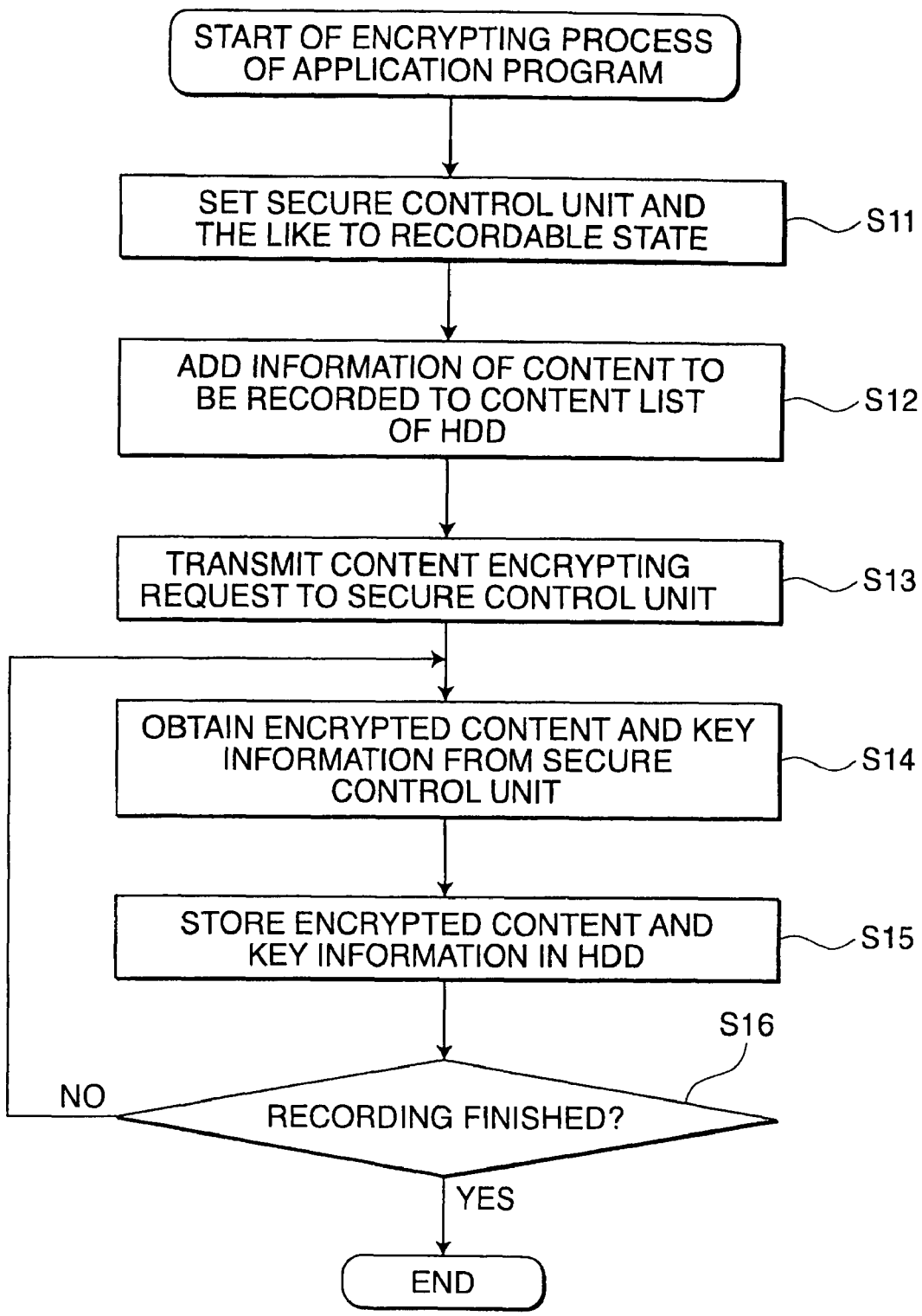
FIG. 8 is a flowchart of a encrypting process of an application program of the invention.

FIG. 8 shows a flowchart of an example of the encrypting process at the time of recording content.

Processes will be described, which are performed when an application program for recording requests the secure control unit to encrypt content and stores the key information KJ generated by the secure control unit and the encrypted content in the HDD 3.

When a recording instruction is input from the user, the application for recording is started.

First, in step S11, the application program for recording sets hardware such as the secure control unit into a recordable state.

Next, in step S12, the application program for recording adds content management information (such as content name) specified by the recording instruction to a content list in the HDD 3.

In step S13, a request for encrypting content which is requested to be recorded is sent to the secure control unit 2. The encrypting request sent to the secure control unit 2 may include, for example, a key generating method.

The secure control unit 2 which received the encrypting request inputs and encrypts the content requested to be recorded, and generates the key K2 used for encrypting and the key information KJ by the function blocks shown in FIG. 2.

In step S14, the content block encrypted by the secure control unit and the generated key information KJ are obtained from the secure control unit. In the case where the key K2 is not newly generated and the same key is continuously used, only encrypted content is obtained and the key information KJ is not obtained. In other words, the key information KJ is obtained only in the case where the new key K2 is generated.

In step S15, the obtained content block and the key information KJ are stored in the HDD 3.

In step S16, a check is made to see whether recording of the whole requested content has been finished or not. If NO, the program returns to step S14 and repeats the process of encrypting content and storing the encrypted content in the HDD 3.

When the recording of the whole content has been finished, the program finishes the process. Acquisition and storage of the key information KJ are performed in any of the forms shown in FIGS. 6A to 6C, and the key information KJ composed of information as shown in FIG. 7 is generated by the secure control unit and stored in the HDD 3.

Figure 9:
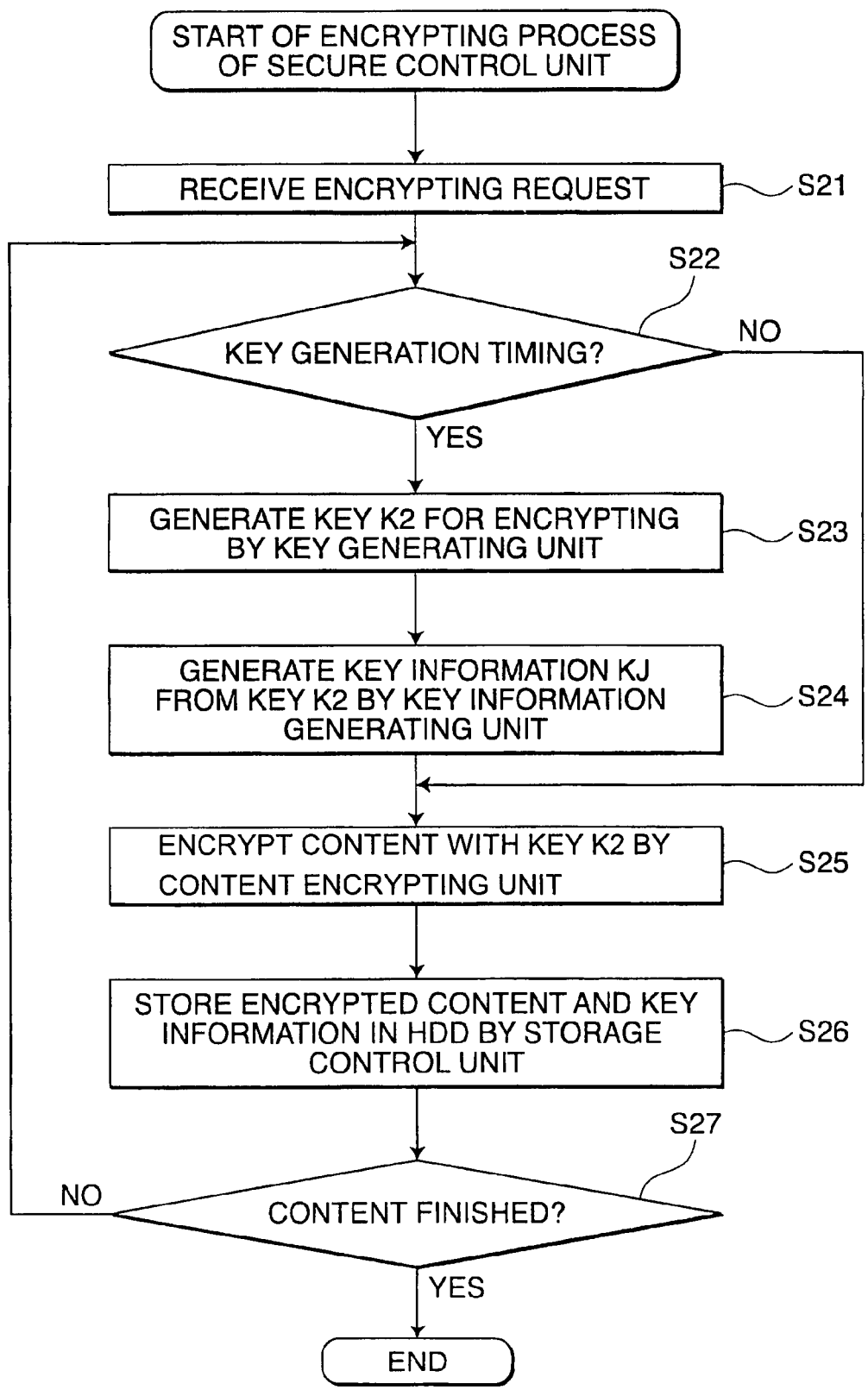
FIG. 9 is a flowchart of a encrypting process of a secure control unit of the invention.

FIG. 9 shows a flowchart of the encrypting process of the secure control unit at the time of recording.

In step S21, whether a content encrypting request is received from the application program for recording or not is checked. If YES, the content of the request is interpreted and the program advances to step S22.

In step S22, whether it is a timing for newly generating the key K2 or not is checked. For example, whether it is a timing corresponding to any of the above-described five timings or not is checked.

When it is not the timing for newly generating the key K2, the program advances to step S25. When it is determined that it is the timing for newly generating the key K2 such as the case a block corresponding to a predetermined amount is input, the program advances to step S23.

In step S23, the key generating unit 22 newly generates the key K2 for encrypting. Generation of the key K2 may vary according to a encrypting algorism. It is sufficient to use a method of generating the key K2 from a random number in a manner similar to the conventional technique. In the case where the key initial value and the key formula are determined in advance, the key K2 is generated on the basis of the value and the formula.

In step S24, the key information generating unit 24 generates the key information KJ in a form as shown in FIG. 7 by using the generated key K2.

In step S25, the content encrypting unit 23 encrypts content by using the generated key K2 on the block unit basis.

In step S26, the storage control unit 29 stores the encrypted block content BC and the key information KJ into the HDD 3.

The information (BC and KJ) may not be stored directly into the HDD 3 by the secure control unit. As shown in the above-described flow of FIG. 8, the information may be supplied once to the application program for recording, and the application program may write the information into the HDD 3.

In step S27, whether all of the content requested to be encrypted has been processed or not is checked. When the encrypting process has not been finished, the program returns to step S22, and again the encrypting process from step S22 to step S26 is repeated on the following block content.

Since the key K2 for encrypting the block content is newly generated at a predetermined timing as described above, even if one of the plurality of keys K2 is leaked, only a partial block encrypted with the leaked key K2 is restored and the whole content cannot be restored (reproduced).

That is, by generating a plurality of keys K2 used for encrypting, sufficient security can be assured.

(Concrete Example of Content Decrypting Process)

Figure 10:
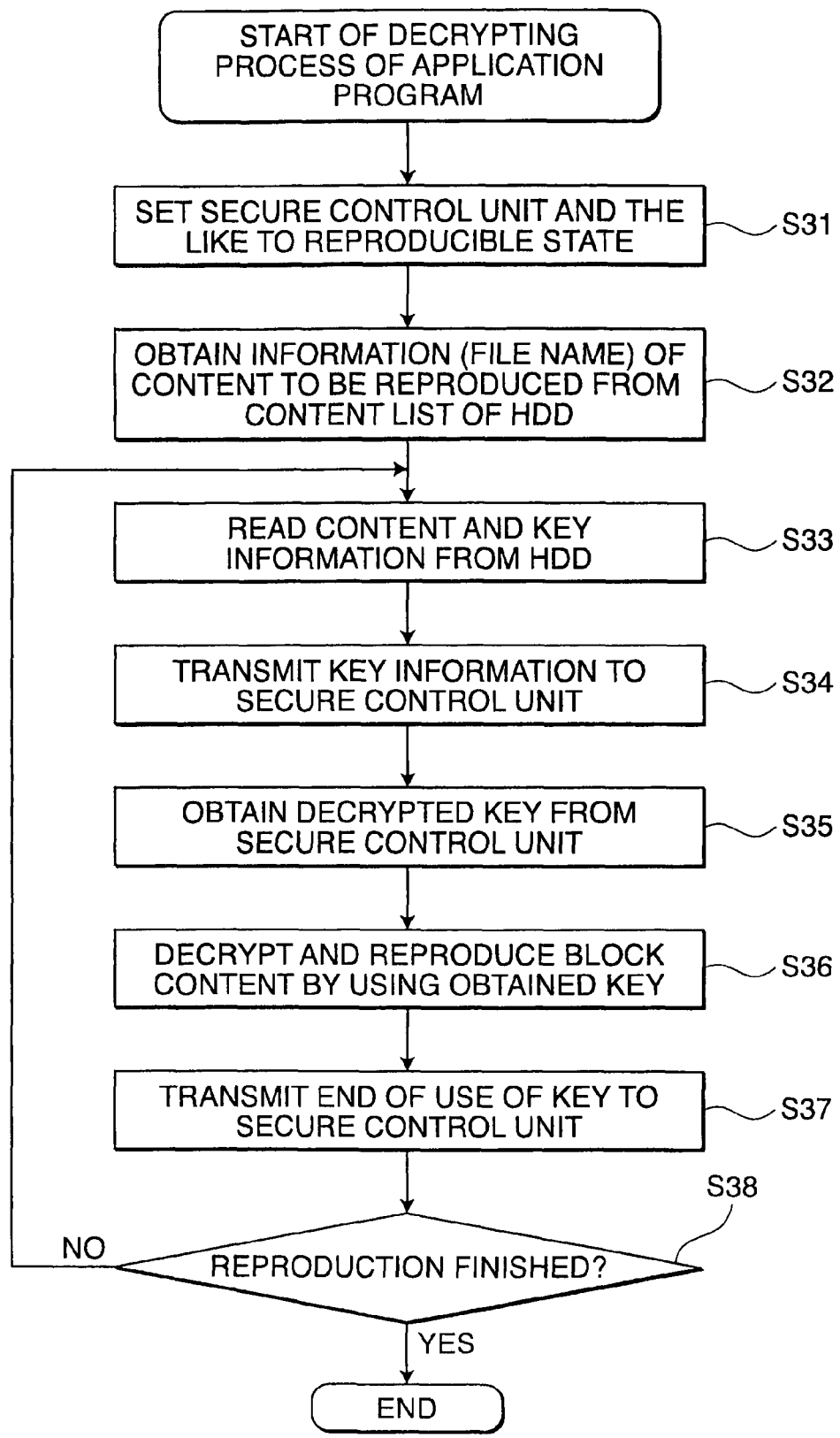
FIG. 10 is a flowchart of a decrypting process of the application program of the invention.

FIG. 10 shows a flowchart showing an example of a decrypting process at the time of reproducing (distributing) content.

Processes will be described, that an application program for reproduction or distribution sends a content decrypting request to the secure control unit, obtains the key K2 for decrypting from the secure control unit, a block of the requested content is directly obtained from the HDD, and the content is reproduced.

First, in step S31, the secure control unit and the like are set to a reproducible state.

In step S32, information such as the file name of content to be reproduced is obtained from the content list in the HDD.

In step S33, the content BC and the key information KJ stored in the HDD so as to be associated with the file name of the content are read directly from the HDD. In this operation, the secure control unit does not intervene.

In step S34, the read key information KJ is supplied to the secure control unit. Specifically, a request for restoring the key K2 corresponding to the key information KJ is sent to the secure control unit. The secure control unit to which the key information KJ was sent determines whether the key K2 specified by the key information KJ can be restored or not. If YES, the secure control unit restores the key K2 and outputs the restored key K2 to the application program.

In step S35, the restored key K2 is obtained from the secure control unit.

In step S36, by using the obtained key K2, the content BC read from the HDD is decrypted and reproduced.

In step S37, after completion of the decrypting of the content, a message that the use of the key K2 is finished is sent to the secure control unit. In the case where key restoration is determined according to the number of keys simultaneously used, the number of keys simultaneously used has to be decreased in response to the completion of use. If the decreasing operation is not performed, the number of keys simultaneously used reaches its limit, restoring operation is not permitted, and the secure control unit does not output the key K2.

In step S38, whether reproduction of all of content to be reproduced has been finished or not is checked. If NO, the program returns to step S33 and the process of decrypting the remaining content is executed. In the case where reproduction of all of the requested content has been finished, the process is finished.

Figure 11:
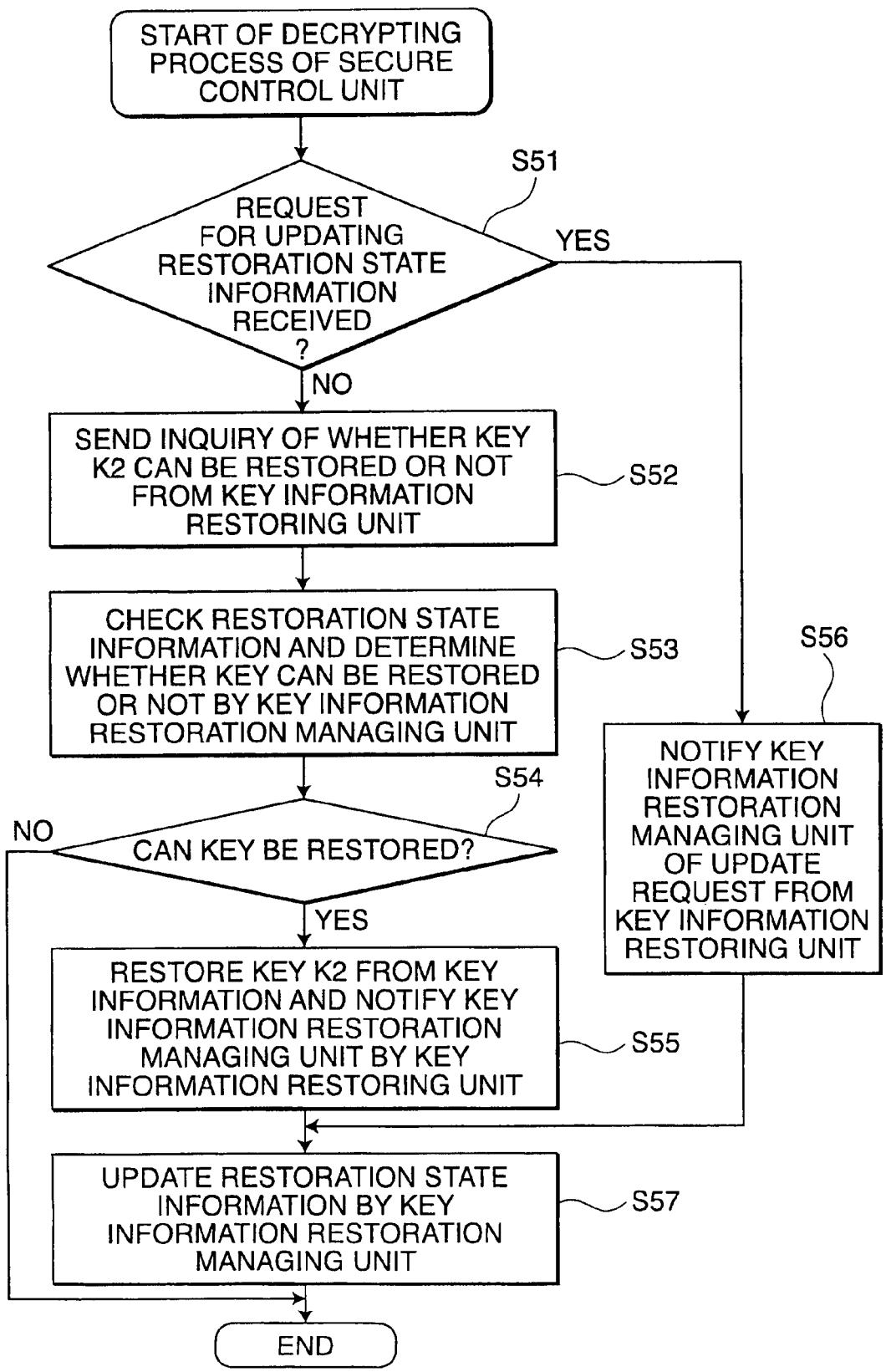
FIG. 11 is a flowchart of a decrypting process of the secure control unit of the invention.

FIG. 11 shows a flowchart of an example of the key restoring process of the secure control unit at the time of reproduction.

The secure control unit receives a restoration request or an update request from the application program, determines whether the key K2 can be restored or not, and if the key K2 can be restored, restores the key K2, and outputs the restored key K2 to the application program.

The update request denotes, for example, a request for continuous use of the key K2 in the case where the application program is currently using the key K2 or periodical notification to the secure control unit of the state where the key K2 is being used. For example, when the secure control unit permits use of the key and, within a predetermined time (for example, 10 seconds), an update request is not received from the application program permitted to use, the key K2 after that is not restored.

Whether a key can be restored or not is determined by the key information restoration managing unit 27.

For example, when there is a restoration request to the secure control unit, the key information restoring unit 26 inquires the key information restoration managing unit 27 of whether restoration can be performed or not and determines whether restoration can be performed or not by checking a restoration state information managed by the key information restoration managing unit 27.

FIG. 12 is a diagram illustrating an example of the restoration state information managed and held by the key information restoration managing unit 27.

FIG. 12 shows the restoration state information of two pieces of content.

With respect to content having content ID of 25, it shows that two keys (1 and 3) are being currently used, and the two keys are restored and output to the application program.

Acquisition time indicates time when a request for restoring the key is received for the first time. Update time denotes time when an update request is received from the application program.

For example, with respect to the key 1, the first restoration request is received at 12:34:20 (hour/minute/second) and, after three seconds, an update request indicating that the restored key 1 is being currently used is received. Time with respect to the key 3 is similar to the above.

Since the update requests from the application program are received with respect to the two keys (1 and 3), the keys can be still used (can be restored).

On the other hand, with respect to content having content ID of 5432, a first restoration request is received at 00:00:00 (hour/minute/second), and the key 5 is output to the application program. After that, no update request is received from the application program. In the case where an update request is not still received after lapse of predetermined time, it is determined that the key cannot be used (restored) after that.

It is also possible to inhibit restoration even if an update request is received depending on the lapse time since the first restoration request.

As described above, the key information restoration managing unit 27 determines whether a key can be restored possible or impossible while generating, recognizing, and updating the key restoration state information as shown in FIG. 12.

In step S51 in FIG. 11, the key information restoring unit 26 checks whether a restoration state update request has been received from the application program or not.

When there is no update request, the program advances to step S52 and an inquiry of whether a key can be restored or not is sent to the key information restoration managing unit 27. When there is an update request, the program advances to step S56 where the update request is notified to the key information restoration managing unit 27.

The key information restoration managing unit 27 which has received the inquiry in step S52 determines whether the key can be restored or not with reference to the restoration state information in step S53.

In the case where a request for restoring the first key is received, whether the key can be restored or not is not determined in step S53 and it is determined in step S54 that the key can be restored.

In the case where it is determined in step S53 that the key can be restored, the program advances to step S55.

On the other hand, when it is determined that the key cannot be restored (step S54), the process is finished without restoring the key.

In step S55, since restoration is permitted, the key information restoring unit 26 restores the corresponding key K2 by using the key information KJ given from the application program, and notifies the key information restoration managing unit 27 of restoration of the key K2.

In step S57, the key information restoration managing unit 27 updates or generates the restoration state information of FIG. 12. For example, in the case of the first restoration request, the restoration state information of the key is generated and the acquisition time is stored.

In the case where the notification of the update request is received in step S56, the update time in the key restoration state information already generated is changed.

As described above, all of the keys K2 requested to restore are not unconditionally output to the application program. A present restoration state is checked to determine whether a key can be restored or not. After that, the key which can be restored is output. In such a manner, when an illegal request for restoring a key is received, the key can be prevented from being unnecessarily output, and content can be prevented from being illegally restored.

Although FIG. 12 shows an example of determining whether restoration can be performed or not by lapse of time since an update request is received, the present invention is not limited to the example.

For example, for a piece of content, the upper limit of requests for restoring the keys K2, which are received simultaneously when a request for reproducing content is made, may be limited to a predetermined number (n).

For example, in the case where a piece of content is made of 100 blocks and 10 pieces of key information exist, the number of requests for restoring keys which can be received simultaneously from the application program is limited to five.

Specifically, five keys K2-1 to K2-5 are simultaneously output to the application program. In a state where the five keys K2 are output (used), a request for restoring the sixth key K2-6 is not received and the sixth key K2-6 is not restored.

It is also possible to determine time T in which one request for restoring a key is received. When a plurality of key restoration requests are received during the time T, only one request may be received and the other requests may not be received.

There are various other methods of determining whether a key can be restored or not. It is possible to change or add the determining method and make a setting of a determining method to be used by the application program.

Alternatively, a method of determining whether a key can be restored or not may be automatically set in accordance with the kind of content or an attribute of content such as the encrypting method.

Figure 13:
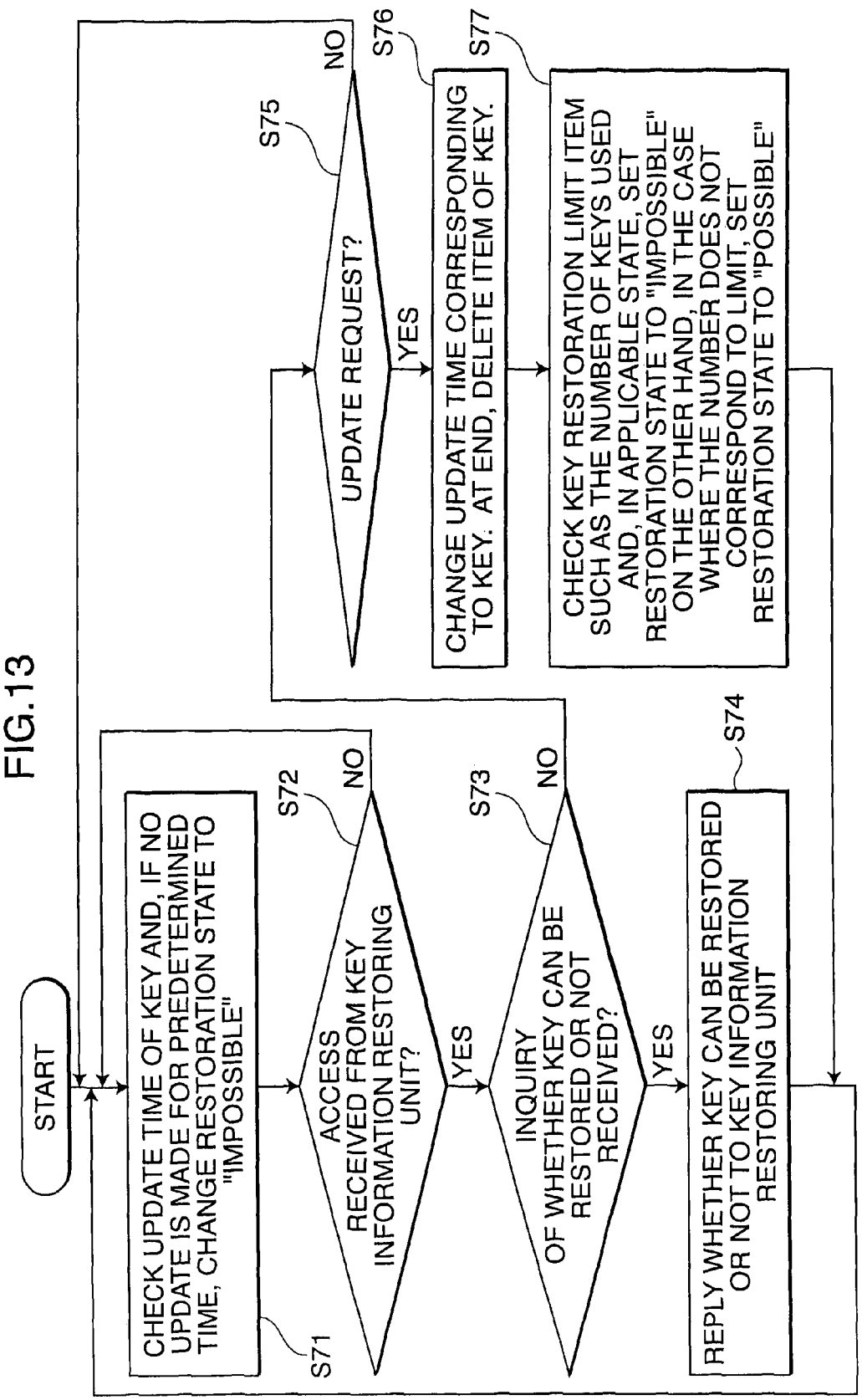
FIG. 13 is a flowchart of a process of determining whether restoration can be performed or not by the key information restoration managing unit of the invention.

FIG. 13 is a flowchart showing an example of the key information restoration managing unit 27.

In step S71, update time in the restoration state information is checked. In the case where predetermined time has elapsed since the updating of last time, the restoration state of the key is changed to "impossible".

In step S72, whether an access is made from the key information restoring unit 26 or not is checked. The access includes an inquiry of whether a key can be restored or not and an update request. When there is no access, the program returns to step S71 and a check to see the restoration state information is continued.

In the case where the access is an inquiry of whether a key can be restored or not in step S73, the program advances to step S74. In the case where the access is an update request in step S75, the program advances to step S76. In the case of the other accesses, the program returns to step S71.

In step S74, with reference to the restoration state information, a reply to the inquiry is sent to the key information restoring unit 26. That is, a result of determining whether the inquired key K2 can be restored or not is sent back to the key information restoring unit 26.

For an inquiry made for the first key restoration request, the restoration state information has not been generated yet. Consequently, a reply that the key can be restored is sent.

After that, the program returns to step S71.

In step S76, update time for the key requested to be updated is changed to the present time. In the case of the first update request, update time is newly added.

In the case where the update request includes information indicative of the end of use of a key, the restoration state information of the key is deleted in order to permit use of the key. Since the use of the key by the application program is finished by the operation, after that, a request for restoring the key can be accepted by another application program.

In step S77, in the case where the upper limit of the number of keys which can be used is set as a reference for determining whether a key can be restored or not, the number of keys used at present is checked. When keys of a number exceeding the set value are being used, the use (restoration state) of the key is set as "impossible".

On the other hand, when it is found that the number of keys being used is below the upper limit as the result of the checking, the use (restoration state) of the key which is set as "impossible" is changed to "possible".

In the case where some keys were used for one piece of content and the number of keys being presently used becomes zero, it is considered that reproduction of the content is finished, and all the restoration state information of the content can be deleted.

The restoration state information as shown in FIG. 12 may be generated each time a restoration request or an update request is received. Alternatively, when the first restoration request is received, information for all of the keys for the content may be generated in advance.

Figure 14:
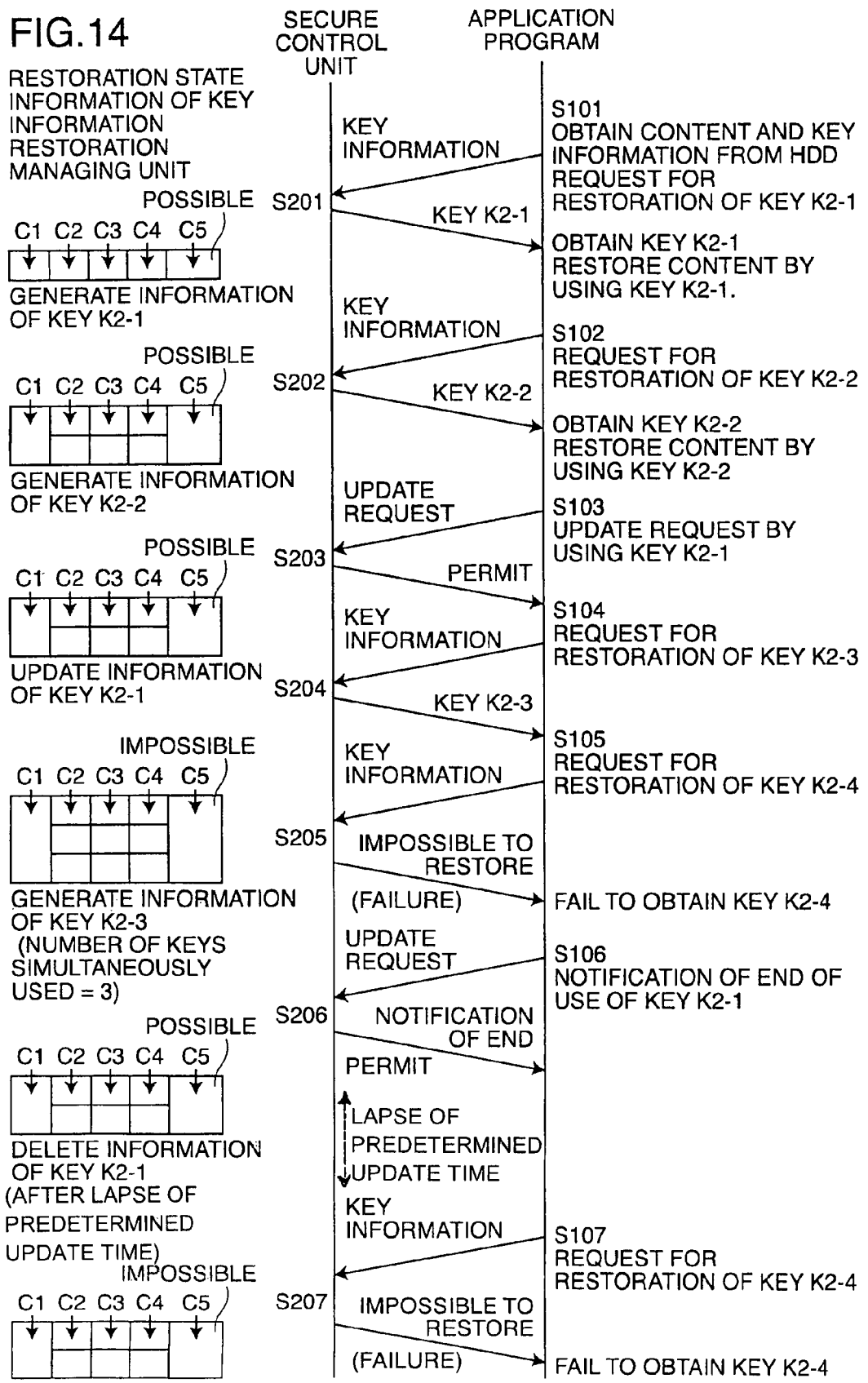
FIG. 14 shows an example of a time chart of a key information restoring process of the invention.

FIG. 14 shows an example of a time chart of key information restoration.

FIG. 14 shows an example of the case where a restoration request and an update request for key information are continuously output from the application and restoration of a key is permitted and the case where restoration of a key is not permitted.

It is assumed that, in S101, a request for restoring key information and a key for a piece of content is sent from the application program to the secure control unit.

In S201, the secure control unit determines whether a key corresponding to the received key information may be restored or not, and generates restoration state information managed by the key information restoration managing unit 27. When it is found that the request is the first restoration request, restoration state information (C1 to C5 in FIG. 12) of the content and the key requested to be restored is generated.

In the case where the request is the first restoration request, the key K2-1 is restored on the basis of the received key information KJ, and the key K2-1 is output to the application program. The application program which received the key K2-1 decrypts corresponding block content by using the key K2-1.

In S102, to decrypt the next block content with a different key, the key information is supplied to the secure control unit.

In S202, the secure control unit checks to see whether the key K2-2 corresponding to the key information can be restored or not, and when the restoration state information does not include information of the key K2-2 to be restored, additionally generates the information of the key K2-2. In this case, the restoration state is set as "possible".

When the restoration state is "possible", the secure control unit restores the key K2-2 and outputs it to the application program. The number of keys being used for a piece of content becomes two.

The application which receives the new key K2-2 restores the corresponding block content.

In S103, to continuously use the key K2-1, a request for updating the key K2-1 is sent to the secure control unit. When the secure control unit which receives the update request determines that the update request is received within a proper time, the secure control unit updates the update time of the key K2-1 (S203).

It is assumed that, in S104, the following key information is transmitted to the secure control unit in order to obtain a new key K2-3 from the application program. The secure control unit determines whether restoring of the key K2-3 corresponding to the key information is permitted or not. When restoring of the key K2-3 is permitted, the secure control unit newly adds the information of the key K2-3 to the restoration state information, and sends the restored key K2-3 to the application program (S204).

When it is assumed that the upper limit of the number of keys permitted to be simultaneously used for the content is three, the "restoration state" in the restoration state information is changed to "impossible".

In S105, key information is sent to the secure control unit in order to obtain the next key K2-4 from the application program. When the secure control unit checks the "restoration state" in S205, the "restoration state" in the restoration management information is "impossible" so that the key K2-4 is not permitted to be restored. A message that the key K2-4 cannot be restored may be sent to the application program.

The application program to which failure in acquisition of the key K2-4 is notified sends an update request to the secure control unit for finishing use of the key K2-1 so that a new key K2-4 can be obtained (S106).

The secure control unit which receives the message indicating the end of use of the key K2-1 deletes the part of the restoration state information corresponding to the key K2-1. Since the number of keys being used at present changes from 3 to 2, the secure control unit changes the "restoration state" to "possible" (S206).

If an update request for obtaining the next key K2-4 is received immediately after that, the key K2-4 is restored and output to the application program.

However, when an update request is not received from the application program even after lapse of predetermined update time after S206 as shown in FIG. 14, the key information restoration managing unit 27 in the secure control unit changes the "restoration state" to "impossible".

Next, the key information for requesting for the next key K2-4 is sent from the application program after lapse of the predetermined update time (S107). Since the "restoration state" is "impossible", the key K2-4 fails to be restored (S207).

The example of the time chart of the case where the requests for restoring the keys K2 are made continuously has been described above. Since a key is restored while determining whether the key can be restored or not, illegal use of content at the time of reproduction can be prevented more effectively, so that a plurality of pieces of content can be simultaneously used while maintaining a safe security state.

Since the use state of a key is managed and whether the key can be restored or not is determined, illegal key acquisition can be prevented.

FIGS. 11 and 13 show an embodiment of the determination of whether a key can be restored or not. However, the invention is not limited to the example.

For example, a common memory which is used only between a secure control unit and an application program is provided, and a key update check and determination of whether a key can be restored or not may be performed by periodically writing and reading specific data to/from the common memory.

For example, the secure control unit writes specific data A indicative of an update request into the common memory and, after that, the application program recognizes the specific data A and checks whether specific data B is written in the common memory or not within a predetermined time. When the secure control unit confirms that the specific data B is written, it is determined that a legal application program has requested for updating of a key.

By preliminarily determining the specific data (A and B) to be written in the common memory at the time of designing a legal application program, illegal leakage of the key K2 caused by intervention of an illegal application can be prevented.

According to the present invention, blocks of content are encrypted while varying generated keys for encrypting content, so that the risk of leakage of the generated keys can be lessened. Even if one of the generated keys is illegally leaked, it is difficult to illegally use the whole content. Thus, security which is necessary and sufficient to protect content can be assured.

The secure device of the present invention performs the generated key restoring process and does not perform the process of restoring content itself, so that the process burden on the secure device can be lessened. Therefore, simultaneous use of a plurality of pieces of content can be substantially realized by using one secure device.

Further, since simultaneous use of a plurality of pieces of content can be realized by using one secure device, as compared with the case of using a plurality of secure devices, the cost of manufacture and development can be reduced, and the number of processes of developing hardware and software can be decreased.

In the case of reproducing content, while managing the restoration state of a generated key necessary for the reproduction, whether the generated key can be restored or not is determined. Consequently, the risk of leakage of a generated key by illegal means can be reduced, and illegal outflow of content can be prevented.

What is claimed is:

1. An integrated circuit comprising:
   an input unit for dividing content into a plurality of blocks and inputting the plurality of blocks;
   a key generating unit for sequentially generating keys for encrypting one or plural blocks;
   a content encrypting unit for encrypting the one or plural blocks by using the generated key;
   a key information generating unit for generating key information for restoring the generated key used for the encrypting by the generated key, wherein the key information includes the generated keys encrypted with a master key peculiar to the integrated circuit;
   a storage control unit for outputting contents of each of the blocks encrypted by the content encrypting unit and the key information generated by the key information generating unit to an external storage;
   a restoration control unit for receiving key information stored in the external storage;
   a key information restoring unit for restoring the generated keys used for the encrypting from the received key information;
   an output unit for outputting the restored generated keys to an information processing mechanism for decrypting the contents in each block stored in the external storage; and
   a key information restoration managing unit for managing a restoration state of the generated keys restored by the key information restoring unit and for determining whether an already restored generated key can be updated or not and whether a generated key to be newly restored can be restored or not on the basis of the restoration state of the generated key already restored,
   wherein the key sequentially generated by the key generating unit is newly generated when a predetermined condition is satisfied, and varies by every one or plural blocks, and
   wherein when the key information restoration managing unit determines that restoration is not permitted, the key information restoring unit does not restore the generated key which is not permitted to be restored.

2. The integrated circuit according to claim 1, wherein the key information includes the generated key and range information specifying the block of contents to which the generated key is applied for encrypting.

3. The integrated circuit according to claim 1, further comprising a key information storing unit for storing a key generated by the key generating unit, wherein the key information includes a key index that specifies the generated key stored in the key information storing unit.

4. The integrated circuit according to claim 3, wherein the key information further includes range information that specifies a block of contents to which the generated key specified by the key index is applied.

5. The integrated circuit according to claim 1, wherein the key generating unit generates a key initial value and, from the key initial value, generates a key on the basis of a predetermined rule, and the key information includes the key initial value.

6. The integrated circuit according to claim 1, wherein when the key information restoration managing unit does not receive an update request from the information processing mechanism and when the number of generated keys that are currently used is equal to the predetermined maximum number of the generated keys, the key information restoration managing unit does not permit the new restoration request of the key, and wherein when the key information restoration managing unit receives a plurality of restoration requests during a predetermined time, the key information restoration managing unit receives only one restoration request and permits to restore only one generated key.

7. An information processing apparatus having a key management function and comprising:

an integrated circuit configured to generate and restore keys for encrypting content and to encrypt the content by using the generated key;

a memory configured to store the encrypted content and key information having data by which the generated key used for encrypting the content can be restored; and a processor configured to reproduce the contents stored in the memory;

wherein the integrated circuit:

divides the content into a plurality of blocks and inputs the plurality of blocks;

sequentially generates keys for encrypting one or plural blocks when a predetermined condition is satisfied;

encrypts the one or plural blocks by using the generated key; generates key information for restoring the generated key used for the encrypting, wherein the key information includes the generated keys encrypted with a master key peculiar to the integrated circuit;

outputs the content of each of the blocks encrypted by the content encrypting unit and the generated key information to the memory;

receives key information for restoring the generated key used for the encrypting from the processor;

restores the generated keys used for the encrypting from the received key information;

outputs the restored generated key to the processor; and manages a restoration state of the keys restored and determines whether an already restored generated key can be updated or not and whether a generated key to be newly restored can be restored or not on the basis of the restoration state of the generated key already restored, and the information processor comprises:

an information obtaining unit for obtaining the content in the block to be reproduced and key information from the memory;

a key obtaining unit for supplying the obtained key information to the integrated circuit and for obtaining a generated key corresponding to the key information from the integrated circuit; and a content restoring unit for reproducing content by sequentially restoring contents in the blocks obtained from the memory by using the generated key obtained from the memory.

* * * * *

UNITED STATES PATENT AND TRADEMARK OFFICE
CERTIFICATE OF CORRECTION

| | | |
|---|---|---|
| PATENT NO. | : 7,978,857 B2 | Page 1 of 1 |
| APPLICATION NO. | : 11/893168 | |
| DATED | : July 12, 2011 | |
| INVENTOR(S) | : Nishiguchi et al. | |

It is certified that error appears in the above-identified patent and that said Letters Patent is hereby corrected as shown below:

Col. 24, line 25 claim 7, delete "information".

Signed and Sealed this
Twenty-second Day of November, 2011

David J. Kappos
*Director of the United States Patent and Trademark Office*